Figure 1:
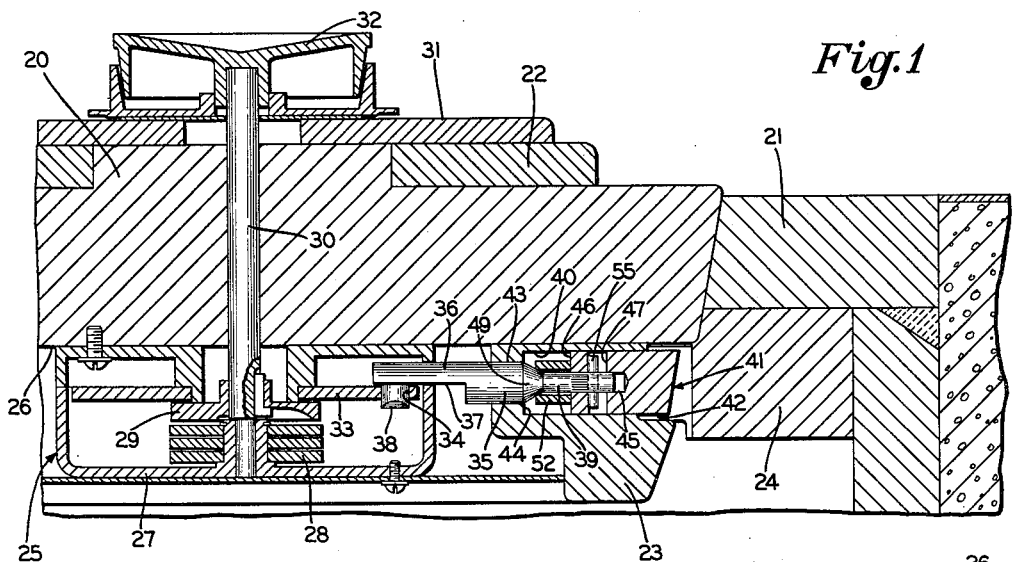

Sept. 24, 1963　　　C. K. ROBERTS ETAL　　　3,104,538
BOLT CONSTRUCTION FOR SAFES, VAULTS AND THE LIKE
Filed Feb. 1, 1960　　　　　　　　　　　　2 Sheets-Sheet 1

INVENTORS
Charles K. Roberts and
BY Charles Norris Smith

Frease, Bishop, Johns & Schick
ATTORNEYS

United States Patent Office 3,104,538
Patented Sept. 24, 1963

3,104,538
BOLT CONSTRUCTION FOR SAFES, VAULTS AND THE LIKE
Charles K. Roberts, Canton, and Charles Norris Smith, North Canton, Ohio, assignors to Diebold, Incorporated, Canton, Ohio, a corporation of Ohio
Filed Feb. 1, 1960, Ser. No. 5,674
19 Claims. (Cl. 70—1.5)

Our invention relates to improvements in bolt construction principally used in safes, vaults and the like, and more specifically to what may be termed a drive-proof bolt construction having blocking means automatically operable upon an attempt to drive the bolt endwise from an engaged position by use of an external driving force against the bolt. Even more specifically, our invention relates to a drive-proof bolt construction having means operable in combination with the bolt and engageable between the bolt and adjacent mounting members for blocking the bolt in an extended securing position, when an attempt is made to drive the bolt from extended position toward retracted non-securing position by the use of an external driving force on the bolt.

In prior constructions of safes, vaults and the like, there have been extensive developments of the combination locks which control the operation of the securing bolts in order to guard these locks against surreptitious manipulation. Furthermore, there have been extensive developments of various forms of drill-proof and flame-proof materials from which the doors of safes and vaults may be fabricated to prevent attack and the gaining of access to the locks and bolts which retain the doors in their locked positions.

Despite these extensive developments in these areas of safe and vault constructions, relatively slight consideration has been given to the protection of the pivotal or cam connections between the operating means or locks and the bolts which are necessary in order for the bolts to be moved by the locks between disengaged and engaged positions and to be retained in engaged positions. Thus, in view of the extreme strengthening of other areas of the safes and vaults, various successful attempts with certain prior constructions have been made to axially or endwise drive the bolts from their securing engaged positions toward disengaged positions. This is accomplished by gaining access to certain portions of the bolts and applying external endwise driving forces on the bolts, which result in a failure of the connections of these bolts to the locks or the locks or bolts proper, thereby permitting the bolts to be driven axially from engaged to disengaged positions.

One possible manner of frustating this bolt driving form of attack would be to increase the strength of the pivotal or cam connections between the bolts and locks, thereby providing sufficient strength so as to make it impossible to free the bolts from control by the locks which would prevent any endwise driving toward disengaged position. This, however, in most cases, has been found to be undesirable and impractical in view of space requirements, required ease of operation and the expense of construction.

It has, therefore, been found desirable to provide some means in operable connection with a particular bolt which will automatically operate upon an attempt to drive the bolt from engaged toward disengaged position to block the bolt in its engaged position and completely frustrate any attempt at this endwise driving. Furthermore, this particular blocking means must be positively operable upon an attempt of said endwise driving, but yet must remain positively inoperable during normal movement of the bolt by the locking or operating mechanism.

It is, therefore, a general object of the present invention to provide a bolt construction for safes, vaults and the like which eliminates the problems and disadvantages of the prior constructions, as discussed above.

It is a primary object of the present invention to provide a bolt construction for safes, vaults and the like which is virtually drive-proof, yet is perfectly operable under normal conditions for movement by the lock or operating means controlling the same between engaged and disengaged positions.

It is a further object of the present invention to provide a bolt construction for safes, vaults and the like in which blocking means is automatically and positively operable when the bolt is in engaged position and an attempt is made to drive the bolt axially or endwise toward disengaged position, whereby the blocking means upon operation will maintain the bolt in its engaged position, frustrating the driving attempt.

It is still a further object of the present invention to provide a bolt construction for safes, vaults and the like constructed such that preferably certain portions of the bolt will telescope when the bolt is in engaged position and an attempt is made to drive the bolt axially or endwise toward disengaged position, with this telescoping causing an automatic extension of blocking means preferably engaging with certain members surrounding the bolt while the bolt remains in an engaged position, thereby securely blocking the bolt against further driving toward disengaged position.

It is another object of the present invention to provide a bolt construction for safes, vaults and the like constructed to perform the foregoing blocking upon an attempt to axially or endwise drive the bolt from engaged toward disengaged position, which blocking is preferably by means automatically axially extendible and engageable with an adjacent shoulder formed in certain of the stationary members surrounding the bolt.

Finally, it is an object of the present invention to provide a bolt construction for safes, vaults and the like which satisfies all of the above objects in a simple and efficient manner, yet may be provided at a minimum of expense.

These and other objects are accomplished by the parts, constructions, arrangements, combinations and subcombinations comprising the present invention, the nature of which is set forth in the following general statement, preferred embodiments of which—illustrative of the best mode in which applicants have contemplated applying the principles—are set forth in the following description and illustrated in the accompanying drawings, and which are particularly and distinctly pointed out and set forth in the appended claims forming a part hereof.

In general terms, the bolt construction for safes, vaults and the like comprising the present invention may be stated as including a bolt mounted movable in frame means for movement between a retracted or disengaged position within the frame means and an engaged position extending into and engaged with a bolt engagement member. Further, the bolt is connected to operating means selectively operable under selected conditions such as release of a lock for moving the bolt between the engaged and disengaged positions. Finally, means is provided operable directly between the bolts and one of the engagement member and frame means upon an attempted urging or driving of the bolt from engaged position toward disengaged position by an outside force separate from the bolt operating means for blocking the bolt member in an engaged position and against surreptitious movement to disengaged position.

The bolt blocking means may be engageable between the bolt and either the frame means movably mounting the bolt or the member which the bolt engages when moved to engaged position, but preferably such blocking takes place between the bolt and frame means movably mounting the bolt. Furthermore, to accomplish this blocking action, the bolt is preferably formed with certain members which may telescope a predetermined distance endwise upon application of the endwise force when the bolt is in engaged position and while the bolt remains in an engaged position, with this telescoping causing an automatic preferably radial extension of blocking means preferably from the bolt to engage a shoulder preferably surrounding a portion of the bolt, whereby the complete blocking takes place.

Figure 2:
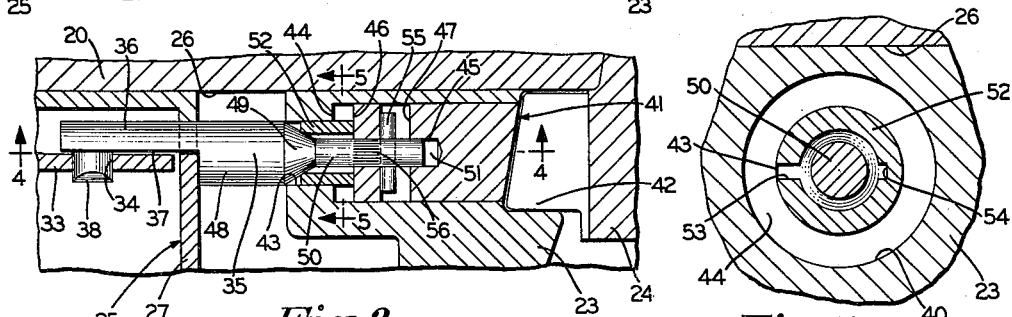
Figure 5:
Figure 3:
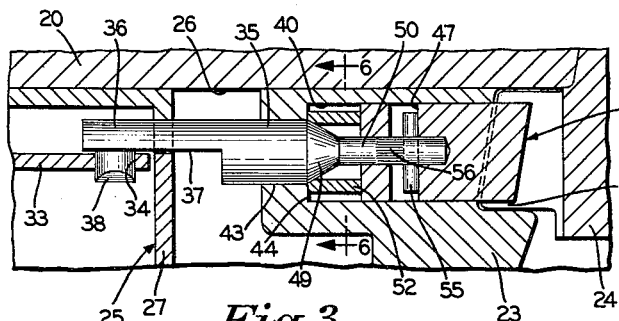
Figure 6:
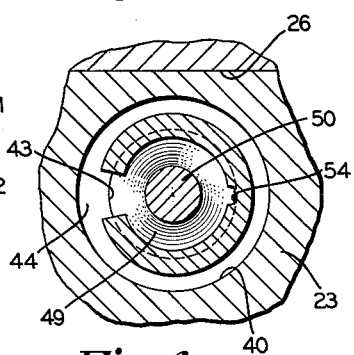
Figure 4:
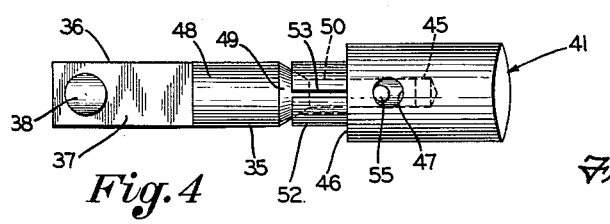
Figure 7:
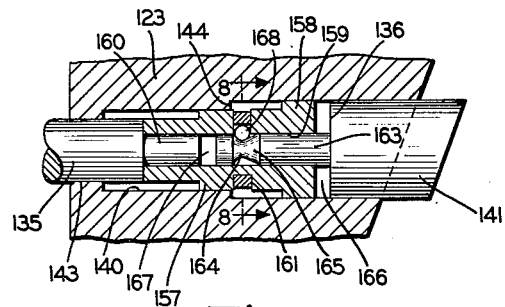
Figure 8:
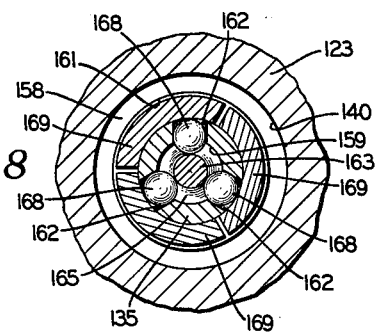
Figure 9:
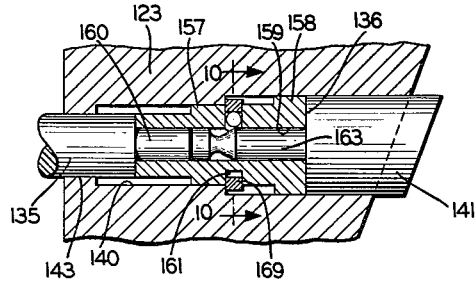
Figure 10:
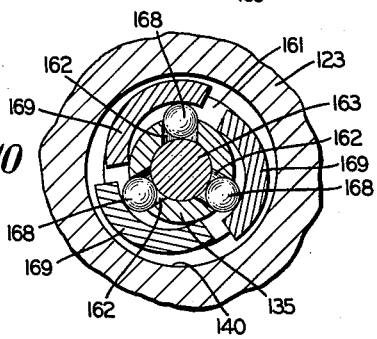
Figure 11:
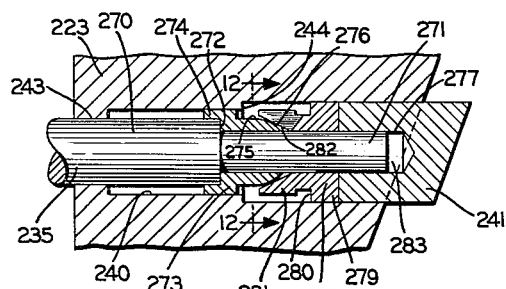
Figure 12:
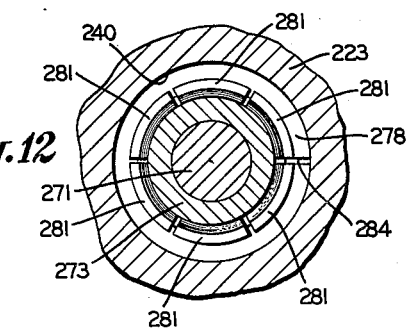
Figure 13:
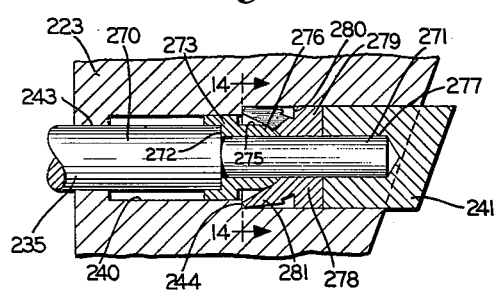
Figure 14:
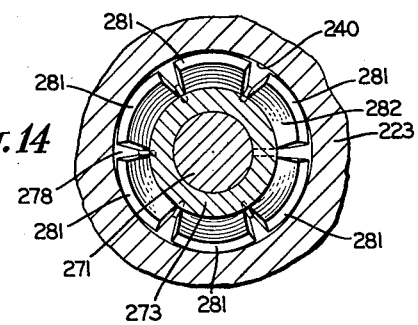

By way of example, embodiments of the bolt construction for safes, vaults and the like of the present invention are illustrated in the accompanying drawings forming a part hereof, wherein like numerals indicate similar parts throughout the several views, and in which:

FIG. 1 is a fragmentary sectional view, part in elevation, showing a form of door, door frame and combination lock operably connected to and mounting an embodiment of the bolt construction of the present invention, with the bolt in its extended or engaged position normally engaged in the door frame;

FIG. 2, an enlarged fragmentary sectional view, part in elevation, similar to FIG. 1, and showing the bolt construction of FIG. 1 in its normal retracted or disengaged position;

FIG. 3, a view similar to FIG. 2, but with the bolt construction in an engaged position and after the blocking means has operated to block the bolt in said engaged position;

FIG. 4, a side elevation of the bolt construction of FIGS. 1, 2 and 3 removed from the door and looking in the direction of the arrows 4—4 in FIG. 2, with the bolt blocking means in inoperable position;

FIG. 5, an enlarged fragmentary sectional view, part in elevation, looking in the direction of the arrows 5—5 in FIG. 2;

FIG. 6, a view similar to FIG. 5, but looking in the direction of the arrows 6—6 in FIG. 3;

FIG. 7, a fragmentary sectional view, part in elevation similar to FIG. 2, but with the door frame removed and showing a second embodiment of the bolt construction, with the bolt in extended or engaged position and the bolt blocking means in inoperative position;

FIG. 8, a fragmentary sectional view, part in elevation, looking in the direction of the arrows 8—8 in FIG. 7;

FIG. 9, a view similar to FIG. 7 showing the second embodiment of the bolt construction in an engaged position and the blocking means in blocking position;

FIG. 10, an enlarged fragmentary sectional view, part in elevation, looking in the direction of the arrows 10—10 in FIG. 9;

FIG. 11, a view similar to FIG. 7 showing a third embodiment of the bolt construction, with the bolt in extended or engaged position and the blocking means in inoperative position;

FIG. 12, an enlarged fragmentary sectional view, part in elevation, looking in the direction of the arrows 12—12 in FIG. 11;

FIG. 13, a view similar to FIG. 11 showing the third embodiment of the bolt construction in an engaged position with the blocking means in operative position; and FIG. 14, an enlarged fragmentary sectional view, part in elevation, looking in the direction of the arrows 14—14 in FIG. 13.

The bolt construction of the present invention is illustrated in the drawings in combination with a particular form of safe construction commonly referred to as a money chest. Furthermore, the bolt construction is shown operated through a combination lock.

It should be understood, however, that the bolt construction of the present invention is adaptable to many forms of safes and vaults and many forms of locks, whether combination or otherwise, and it is not intended to limit the use of the bolt construction to the particular safe construction illustrated. Also, the broad principles of the present invention are applicable to many forms of bolts, and it is likewise not intended to limit the broad principles of the present invention to the particular three embodiments thereof illustrated in the drawings and hereinafter described.

As shown in FIG. 1, the usual money-chest type of safe door is indicated at 20 swingingly mounted on the door frame 21 and rotatable a restricted distance in a usual manner on the door frame through an annular mounting plate 22. The door 20 has the usual lugs 23 which are arranged in bayonet-joint fashion with corresponding lugs 24 on the door frame 21 so that door 20 may be moved swingingly to its closed position within the door frame 21, as shown in FIG. 1, with the door lugs 23 telescoping through or between the door frame lugs 24, after which, by a selected rotation of the door 20 on the mounting frame 22, the door lugs 23 will engage behind the door frame lugs 24, also as shown in FIG. 1.

A usual combination lock, generally indicated at 25, is mounted on a back face 26 of door 20 having the usual case 27, the series of generally cylindrical and axially aligned tumblers 28 and driver cam 29. Furthermore, combination lock 25 has the usual spindle 30 extending through door 20 and connected at the door front face 31 to the usual knob 32.

Combination lock 25 is arranged in usual manner so that, by the setting of a predetermined combination, the driver cam 29 through the spindle 30 and knob 32 will rotate a usual bolt operating cam plate 33. Cam plate 33 is operably connected through one or more cam slots 34 to one or more operating levers 35. In the particular embodiment shown in FIG. 1, merely a single cam slot 34 and operating lever 35 is shown, but where a number of bolts is desirable, a series of such cam slots and operating levers could be provided in the usual manner.

In the particular embodiment shown in the drawings, the operating lever 35 is generally cylindrical in overall configuration, being provided at its inner end 36 with the cutout 37 and with this inner end 36 slidably telescoping through the lock case 27. Further, at the extreme inner end of operating lever 35 is mounted the lug 38 extending into the cutout 37 and slidably received within the cam slot 34 of the cam plate 33.

The outer end 39 of the operating lever 35 is slidably telescoped through a portion of one of the door lugs 23 and is received within the outwardly opening generally cylindrical recess 40 formed within the door lug 23. The generally cylindrical bolt, indicated at 41, is slidably or reciprocally received within recess 40 and is connected for reciprocal movement with the operating lever 35, with this bolt 41 being selectively receivable endwise or axially engaged in the usual bolt recess 42 formed in the corresponding door frame lug 24, when the door lug 23 and door frame lug 24 are in their proper bayonet-engaged positions.

Thus, with the foregoing usual construction, when the proper combination has been set in the combinaion lock 25, by rotating the spindle 30 through the knob 32, the bolt operating cam plate 33 is rotated causing the operating lever 35 and bolt 41, through the lug 38 and cam slot 34, to be moved axially from engaged position, as shown in FIG. 1, to disengaged position, as shown in FIG. 2. With the bolt 41 disengaged from the door frame lug 23, the door 20 may then be rotated a restricted amount on the mounting plate 22 to disengage the door lugs 23 from behind the door frame lugs 24 so that the door 20 may then be moved swingingly to an open position.

Also, when the door 20 is then swingingly returned to its closed position in the door frame 21, the door 20 may be rotated on the mounting plate 22 to the position shown in FIG. 1 in which the door lugs 23 engage behind the door frame lugs 24. Thereafter, the bolt operating cam plate 33 may be rotated through the spindle 30 and knob 32 in the reverse direction, causing the operating lever 35 and bolt 41 to be extended and moved to engaged position, with the bolt being received in the bolt recess 42 of the door frame lug 24, thereby securely locking the door 20 in door frame 21.

The foregoing generally described construction is of conventional form and, in the general terms stated, is not claimed as a part of the present invention other than certain parts of the broad general overall combination. The principles of the present invention are incorporated in the specific formation and connections of and between the operating lever 35 and bolt 41, which will be hereinafter described.

For the purposes of the present invention, the operating lever 35 is generally cylindrical forward of the inner end 36 and cutout 37 and is slidably reciprocally received through a matching generally cylindrical opening 43 in the door lug 23, with opening 43 connecting into the recess 40. Opening 43 extends coaxially, with the generally cylindrical recess 40, being a predetermined amount smaller in diameter than the recess to form the internal engagement shoulder 44 in the door lug 23 at the inner end of recess 40 and annularly surrounding the outer end of the opening 43.

Bolt 41 is also preferably generally cylindrical, matching the recess 40 and being mounted for slidable reciprocal movement therein from a retracted position, as shown in FIG. 2, preferably totally telescoped within recess 40, and an extended position extending partially from the recess and engaging in the bolt recess 42 of the door frame lug 24, as shown in FIG. 1. Bolt 41 is provided with an operating lever opening 45 formed preferably coaxially of the outer circumference of bolt 41, beginning intermediate the axial length of the bolt and opening inwardly at the inner end 46 of the bolt within the recess 40. Also, bolt 41, in this first embodiment construction, is provided with the radially extending pin opening formed diametrically therethrough, spaced forwardly of the bolt inner end 46 and intersecting the operating lever opening 45, thereby providing a portion of the operating lever opening extending outwardly of the pin opening terminating within the bolt and a portion of the operating lever opening extending inwardly of the pin opening to the bolt inner end 46.

The portion of the operating lever 35 outward of the lever inner end 36 and cutout 37 which is of matching diameter to the opening 43 in the door lug 23 may be termed the large diameter portion 48 of the operating lever, and at the outer end, this large diameter portion tapers radially to a smaller diameter matching to the bolt operating lever opening 45, thereby forming the generally conical tapered portion 49 and the small diameter portion 50 on the operating lever. The small diameter portion 50 is also generally cylindrical and extends outwardly from the tapered portion 49 to form the operating lever outer extremity.

The small diameter portion 50 of operating lever 35 extends outwardly to the bolt 41 and then telescopes within the bolt operating lever opening 45 through the pin opening 47 and terminates slightly forwardly of the pin opening, but spaced inwardly from the outer end of the operating lever opening 45. Thus, normally a clearance space 51 of a minimum predetermined axial length is provided between the outer end of the bolt operating lever opening 45 and the outer end of the operating lever small diameter portion 50.

A split spring collar 52 is mounted normally surrounding the part of the operating lever small diameter portion 50 which normally extends from the inner end 46 of the bolt 41 to the conical tapered portion 49 on the operating lever 35, so that this spring collar 52 normally preferably rests against the bolt inner end 46 and the operating lever tapered portion 49, spanning the axial distance therebetween. As shown in FIGS. 4 and 5, the spring collar 52 is split its entire axial length by the axially extending slot 53 and is also internally notched its entire axial length diametrically opposite from slot 53 by the groove 54, both of which are for a purpose to be hereinafter described.

A pin 55 is mounted extending radially through the operating lever small diameter portion 50 within the bolt pin opening 47, with this pin normally resting against the innermost surface of pin opening 47 and being an amount smaller in diameter than the pin opening approximately equal to the previously described clearance space 51 left forwardly of the operating lever 35 within the bolt operating lever opening 45. Finally, to complete the normal connection between the operating lever 35 and bolt 41, a knurled surface 56 is preferably formed on the small diameter portion 50 of the operating lever 35 on that part of the small diameter portion normally extending inwardly between the pin opening 47 and the bolt inner end 46, with this knurled surface 56 having a press fit with the bolt 41 and the remainder of the small diameter portion 50 of the operating lever 35 having a sliding fit within the bolt operating lever opening 45.

Thus, the operating lever 35 and bolt 41 are connected for simultaneous reciprocal movement by the cam slot 34 of the bolt operating cam plate 33 through the operating lever lug 38, as previously discussed, and this lever and bolt are normally maintained simultaneously movable by the engagement of the spring collar 52 between the operating lever tapered portion 49 and the bolt inner end 46, and also the engagement of the pin 55 between the operating lever 35 and bolt 41 within the pin opening 47. With the spring collar 52 at one side and the pin 55 at the other side, the operating lever 35 and bolt 41 are maintained simultaneously reciprocal both outwardly to a position in which the bolt 41 is engaged within the door frame lug 24 and inwardly to a position in which the bolt 41 is free of the door frame lug 24.

As can be seen in FIG. 1, when the operating lever 35 and bolt 41 are moved to extended or engaged position, the inner end of the operating lever tapered portion 49 is substantially radially aligned with the engagement shoulder 44 formed at the inner end of the door lug recess 40, with the spring collar 52 being spaced outwardly of engagement shoulder 44 surrounding the outermost part of this operating lever tapered portion 49. Furthermore, as shown in FIGS. 1, 2 and 4, in this normal position, the outer circumference of the spring collar 52 is substantially equal to the operating lever large diameter portion 48, so that, as shown in FIG. 2, when the operating lever 35 and bolt 41 are moved inwardly to retracted or disengaged positions, the spring collar 52 may telescope within the door lug opening 43 and thereby will not obstruct normal reciprocal movement of the operating lever and bolt.

The usual means of attack when an attempt is being made to drive the bolt endwise would be to drill or burn an opening through the door frame 21 at an angle to the outer end portion of bolt 41, and then by use of some driving instrument, to attempt to force the bolt 41 from its extended or engaged position, as shown in FIG. 1, inwardly toward its retracted or disengaged position, as shown in FIG. 2. When such a driving attempt is made with the bolt construction of the present invention, as described above in this first embodiment, the endwise or axial forces on the bolt 41 cause a slight relative telescoping action between the operating lever 35 and bolt 41, in which the operating lever telescopes a greater distance into the bolt operating lever opening 45, taking up the clearance space 51 at the outer end of this opening. This further telescoping is the result of the endwise driving forces on the bolt 41, which are resisted by the operating lever 35, causing the knurled surface 56 on the operating lever small diameter portion 50 to release from the bolt 41, thereby causing the bolt to move the spring collar 52 along the operating lever tapered portion 49, resulting in radial expansion of the spring collar.

Further, this slight relative telescoping action is permitted by the pin 55 being of a smaller diameter than the bolt in opening 47, and, as shown in FIG. 3, at the end of this slight telescoping, substantially the entire clearance space 51 will be filled by the operating lever 35 and the pin 55 will preferably rest at the outermost surface portion of the bolt pin opening 47. Also, as this slight telescoping is completed, the spring collar 52 has moved substantially the complete axial length of the operating lever tapered portion 49, with this spring collar expanding sufficiently to fully engage the engagement shoulder 44 on bolt 41 within the door lug recess 40.

Thus, from this driving action, the bolt 41 has moved slightly from its fully extended or fully engaged position within the door frame lug 24, but this slight telescoping of the operating lever 35 and 41 is not sufficient to completely withdraw bolt 41 from the door frame lug 24, and for this reason the bolt remains securely engaged with the door frame lug and retains the door 20 against any movement. At the same time, due to the full engagement of the spring collar 52 with the engagement shoulder 44 of the door lug 23 and with the outer end of this spring collar resting against the bolt inner end 46, further endwise or axial driving of bolt 41 is effectively and securely blocked so that it is virtually impossible to drive the bolt fully into its fully retracted or disengaged position.

The purpose of the slot 53 in the spring collar 52 is, of course, to permit the expansion of the spring collar as caused by its axial movement along the operating lever tapered portion 49. Further, the purpose of the internal notching of spring collar 52 by the groove 54 is to provide more uniform expansion of the spring collar during this movement and insure a full engagement of the spring collar with the door lug engagement shoulder 44 when this slight telescoping between the operating lever 35 and bolt 41 is completed, to thereby insure effective blocking of the bolt member by this spring collar.

The second embodiment of the bolt construction of the present invention is shown in FIGS. 7 and 8, wherein a portion of the door lug is indicated at 123, the operating lever at 135 and the bolt at 141. Further, in this second embodiment, the door lug recess is indicated generally at 140, the door lug opening at 143 and the door lug engagement shoulder at 144, which in this form is positioned intermediate the axial length of the recess 140.

The portion of the operating lever 135 extending into the door lug recess 140 is generally uniformly cylindrical for slidably guiding in the door lug opening 143, but at the outer end, this operating lever is provided with an increased diameter guide portion 157, which slidably guides the operating lever for reciprocal movement within the door lug recess 140 inwardly of the engagement shoulder 144. When the bolt 141 is in engaged or extended position, as shown in FIG. 7, this operating lever guide portion 157 extends axially both inwardly and outwardly of the engagement shoulder 144, with this guide portion 157 terminating spaced axially outward of the engagement shoulder in a second guide portion 158, which slidably guides the operating lever for reciprocal movement within the recess 140 outwardly of the engagement shoulder 144. This second guide portion 158 also forms the axially outer end of the operating lever 135.

An axially extending centrally located generally cylindrical opening 159 is formed in the operating lever 135 opening outwardly toward the bolt 141 and extending axially within the operating lever to a point spaced axially inward of the operating lever innermost guide portion 157, with the innermost end of this opening 159 being filled by a plug 160 of predetermined axial length. Plug 160 in the particular form shown terminates substantially radially aligned with the innermost end of the guide portion 157, but the axial length of this plug 160 is determined by other considerations, which will be hereinafter discussed.

Intermediate the axial length of the operating lever inner guide portion 157, the operating lever is formed with a generally rectangular cross section annular groove 161 opening radially into the recess 140 and terminating spaced radially from the operating lever opening 159, as shown. As best shown in FIG. 8, at preferably three circumferentially spaced points, radially extending ball slots 162 are formed from the bottom of groove 161 radially into the operating lever opening 159, so that these slots open radially both into the groove 161 as well as the opening 159, again for a purpose to be hereinafter described.

The generally cylindrical bolt 141 is reciprocally guided in the recess 140 outwardly of the operating lever 135 and at the inner end 136 is formed with the axially inwardly extending actuating rod 163 which is slidably received axially within the operating lever opening 159. Actuating rod 163 is formed spaced from the innermost end with an arcuate cross section radially and circumferentially extending cam groove 164 opening radially toward the operating lever 135. This cam groove, as before stated, is arcuate in cross section and particularly must taper axially toward the outer end of bolt 141 to form the tapered cam surface 165.

The bolt actuating rod 163 is normally received within the operating lever opening 159, with the axially inner edge of the bolt cam groove 164 generally radially aligned with the axially inner edge of the operating lever groove 161 previously described, so that the major portion of the bolt cam groove 164 registers radially with the operating lever groove 161. With this normal relative positioning of the operating lever 135 and bolt 141, an axially extending clearance space 166 is provided between the bolt inner end 136 and the outermost end of the operating lever 135, which is formed by the second guide portion 158. Also, in this relative positioning, a clearance space 167 is formed within the operating lever opening 159 axially between the innermost end of the bolt actuating rod 163 and the outermost end of the plug 160, and, as will be hereinafter seen, it is important that this second clearance space 167 be at least as great, if not greater, in axial length than the clearance space 166.

In order to normally retain the operating lever 135 and bolt 141 in their relative positions with respect to each other and for normal simultaneous reciprocal movement within the door lug recess 140, a ball 168 is received in each of the operating lever ball slots 162, with these balls engaged partially in the bolt actuating rod cam groove 164 and partially in the operating lever ball slots 162, thereby forming an axially abutting connection between the operating lever 135 and bolt 141. Further, these balls 168 are normally retained positioned partially engaged with the operating lever 135 and partially engaged with the bolt 141 by preferably three arcuate blocking segments 169, which blocking segments are received in the operating lever groove 161 by a press fit and with one of these segments radially abutting each of the balls. Finally, the blocking segments 169 are of less or equal to the radial dimensions of the operating lever groove 161, so that normally these segments, when press fit in the groove radially abutting and maintaining the balls 168 properly positioned, do not extend radially beyond the operating lever guide portion 157.

Thus, the operating lever 135 and bolt 141 are normally maintained axially positioned relative to each other by the common engagement with the balls 168, which balls are retained securely in place by the press fit of the blocking segments 169 in the operating lever 135. Further, in view of the positioning of the blocking segments 169, the operating lever 135 and bolt 141 are free to reciprocate within the door lug recess 140 between engaged and disengaged positions as is necessary for the proper operation of the bolt 141 by the operating lever 135.

When the operating lever 135 and bolt 141 are in their normal extended positions, as shown in FIG. 7, the innermost edge of the operating lever groove 161 is substantially radially aligned or slightly axially outward of the door lug engagement shoulder 144, so that in this position the innermost edge of the blocking segments 169 are likewise radially aligned with or slightly axially outward of engagement shoulder 144. This particular relative positioning of the blocking segments 169 with reference to the engagement shoulder 144 is of the utmost importance in order for this second embodiment of the bolt construction to accomplish its bolt blocking action in the event an attempt is made at driving the bolt 141 toward disengaged position.

With this second embodiment construction, when such an endwise driving is attempted, the axial forces on the bolt 141 will cause relative axial telescoping between the operating lever 135 and bolt 141 as a result of a slight axial inner movement of bolt 141 with reference to operating lever 135. This limited telescoping between operating lever 135 and bolt 141 will cause the bolt actuating rod 163 to move inwardly a greater axial distance into the operating lever opening 159, and this axially inward movement is permitted in part by the clearance spaces 166 and 167 previously described.

Further, this limited telescoping will move the actuating rod cam groove 164 axially inward relative to the balls 168 causing these balls to move radially in the direction of the blocking segments 169 due to the cam surface 165 of the cam groove 164. As the balls 168 are urged radially, they will move the blocking segments 169 radially from the press fit of these blocking segments in the operating lever groove 161 radially toward the door lug 123 and, as shown in FIGS. 9 and 10, engage these blocking segments 169 axially adjacent and with the door lug engagement shoulder 144.

When the limited telescoping between the operating lever 135 and bolt 141 has been completed, taking up the entire clearance space 166, the bolt inner end 136 will abut the operating lever 135 and also each of the blocking segments 169 will have fully engaged with the door lug engagement shoulder 144, thereby solidly blocking the bolt 141 from further axial driving toward disengaged position. As is apparent from FIG. 9, the limited telescoping of operating lever 135 and bolt 141 is only that which is required for moving the blocking segments 169 radially into full engagement with the door lug engagement shoulder 144, and at the end of this limited telescoping or blocking movement, a major part of the bolt 141 is still in an engaged position, as previously described in the first embodiment construction.

The third embodiment of the bolt construction of the present invention is shown in FIGS. 11 and 12, with the door lug indicated at 223, the operating lever at 235 and the bolt at 241. Further, the door lug recess is indicated at 240, with the door lug engagement shoulder 244 again being positioned intermediate the axial length of recess 240, as in the foregoing second embodiment.

In this third embodiment, the operating lever is slidably received through the door lug opening 243 at a generally cylindrical large diameter portion 270 on the operating lever, which portion 270 terminates forwardly in a small diameter portion 271 with a radially extending shoulder 272 formed therebetween. A generally cylindrical actuating sleeve 273 is positioned telescoped over the operating lever 235 partially telescoping the small diameter portion 271, partially telescoping the large diameter portion 270, and securely engaging the shoulder 272 therebetween.

This actuating sleeve 273 has a guide portion 274 slidably received in the door lug recess 240 axially inwardly of the door lug engagement shoulder 244 for reciprocally guiding the operating lever 235 within the recess 240. Axially outward of the guide portion 274, the actuating sleeve 273 is formed with a cam portion 275 which terminates axially outward in a tapered surface 276 angling radially toward the operating lever small diameter portion 271.

The bolt 241 is formed with an axially inwardly opening recess 277 and is telescoped over the operating lever 235, with the forward end of the operating lever small diameter portion 271 received in a press fit partially in the recess 277. Axially inwardly abutting the bolt 241 is the blocking collet 278, which has a guide portion 279 axially adjacent bolt 241 slidably engaging the door lug recess 240.

Axially inward of the guide portion 279, the blocking collet 278 is formed with an annular relief slot 280 and the blocking collet terminates axially inwardly in the series of flexible axially extending blocking fingers 281. The blocking collet 278 is received telescoped over the operating lever small diameter portion 271 axially inward of and abutting bolt 241 and normally partially telescoping the tapered surface 276 of the actuating sleeve cam portion 275.

The blocking collet blocking fingers 281 are formed radially adjacent the operating lever small diameter portion 271 with the tapered surfaces 282 which conform generally to the tapered surface 276 on the actuating sleeve 273. With the blocking fingers 281 normally telescoped with and normally abutting the actuating sleeve 273, as shown in FIG. 11, the outer circumference of these blocking fingers 281 is substantially equal to or slightly less than the guide portion 274 of actuating sleeve 273. Thus, under normal simultaneous reciprocal movement of the operating lever 235 and bolt 241, these blocking fingers 281 may move slidably into the part of the door lug recess 240 inwardly of the blocking shoulder 244 and thereby permit normal movement of the operating lever and bolt from engaged to disengaged positions.

Further, the axial length of telescoping of the blocking collet 278 over the actuating sleeve 273 is predetermined for normal positioning, so that the bolt 241 is telescoped over the operating lever small diameter portion 271 a predetermined amount less than the full axial length of the bolt recess 277, leaving the clearance space 283 for further telescoping between the operating lever 235 and bolt 241 under predetermined conditions. The press fit between the bolt 241 and the operating lever 235 is, however, sufficient to normally move the bolt with the operating lever under normal conditions between engaged and disengaged positions.

In forming the blocking fingers 281 on the blocking collet 278, the number and formation of such fingers as well as the depth or need of the relief slot 280 in this blocking collet will be dependent on the material used in forming the collet and the ease with which it is desired to permit these blocking fingers to expand for performing their blocking formation, as will be hereinafter described. As shown in FIG. 12, it is desirable under certain circumstances to form one of the axial slots 284 completely axially through the blocking collet 278 in order to increase the expanding flexibility of this collet and insure the blocking action.

With this third embodiment construction, when the operating lever 235 and bolt 241 are in their normally engaged positions, as shown in FIG. 11, and an axial driving force is exerted against the bolt 241, as previously described, this driving force, resisted by the operating lever 235, will cause the bolt 241 to telescope axially a predetermined greater amount with the operating lever small diameter portion 271, thereby taking up the clearance space 283. This increased telescoping or relative axial movement between the operating lever 235 and bolt 241 will force the blocking collet 278 axially to more completely telescope the actuating sleeve 273.

Since the collet blocking fingers 281 normally, as shown in FIG. 11, are positioned axially outwardly of the door lug engagement shoulder 244, when the operating lever 235 and bolt 241 are in their normally engaged positions, this axial driving of the blocking collet 278 a greater distance axially over the actuating sleeve 273 will cause these blocking fingers to be driven axially toward the engagement shoulder 244. At the same time, due to the actuating sleeve tapered surfaces 276 and the blocking finger 281, this axial driving of the blocking collet 278 will force these blocking fingers radially toward the door lug 223 and into engagement with the door lug engagement shoulder 244. Finally, as shown in FIG. 13, when the operating lever 235 and bolt 241 are telescoped the predetermined possible axial extent, taking up the clearance space 283, the blocking fingers 281 of the blocking collet 278 will be fully engaged with the door lug engagement shoulder 244, thereby completely blocking the bolt 241 in an engaged position and secure against axial movement toward disengaged position by any further axial driving force.

Thus, according to the broad principles of the present invention, specific forms of which are illustrated in the three embodiments in the drawings, upon an attempt to drive the bolt axially or endwise from its fully engaged position by an external driving force and a force different from that normally applied by the operating means, some form of blocking means automatically engages between the bolt and either a portion of the door or door frame encasing the bolt when in this extended position, thereby directly blocking the bolt against being driven to its fully retracted or disengaged position and effectively resisting further driving forces. Although in the three embodiments shown in the drawings the blocking means engages directly between the bolt and the member, in this case, the door, reciprocally mounting the bolt, it is obvious that this blocking means could be formed for engagement within the member which receives the end portion of the bolt in its engaged position, in this case, the door frame, and it is not intended to limit the broad principles of the present invention to either specific form.

According to the more specific forms of the invention shown in the three embodiments of the drawings, in each case the bolt construction is formed in such a way that the normal operable connection between the operating lever and bolt provides axially extending clearance spaces which permit a limited relative axial movement or telescoping between the bolt and operating lever upon the application of the outside driving forces, with the bolt at the termination of such limited relative movement still remaining in a secure engaged position. This limited relative movement between the operating lever and bolt, however, taking up the clearance spaces deliberately provided, provides the motion for axially extending a blocking member to engage between the bolt and the means reciprocally mounting the bolt, thereby providing an automatic and positive blocking action to frustrate the outside driving attempts.

In the first embodiment, shown in FIGS. 1 through 6, the spring collar 52 is moved axially inward along the operating lever conical tapered portion 49 which urges this spring collar to expand radially and securely engage the door lug engagement shoulder 44. In the second embodiment, shown in FIGS. 7 through 10, the axial movement of the actuating rod 163 causes the cam surface 165 of the cam groove 164 to move axially with respect to the balls 168, expanding these balls radially, which in turn expand the blocking segments 169 radially to securely engage the door lug engagement shoulder 144.

Finally, in the third embodiment, shown in FIGS. 11 through 14, axial movement of the blocking collet 278 causes the blocking fingers 281 of this collet to move axially inwardly along the actuating sleeve tapered surface 276, expanding these blocking fingers radially to securely engage the door lug engagement shoulder 244. Thus, in each of the three embodiments, the limited axial telescoping between the bolts and operating levers automatically results in an expanding of blocking means operably connected to the bolts, whereby effective blocking between the bolts and the members reciprocally mounting these bolts takes place.

In the foregoing description, certain terms have been used for brevity, clearness and understanding, but no unnecessary limitations are to be implied therefrom, because such words are used for descriptive purposes herein, and are intended to be broadly construed.

Moreover, the embodiments of the improved construction illustrated and described herein are by way of example, and the scope of the present invention is not limited to the exact details of the construction shown.

Having now described the invention, the construction, operation and use of preferred embodiments thereof, and the advantageous new and useful results obtained thereby; the new and useful construction and reasonable mechanical equivalents thereof obvious to those skilled in the art are set forth in the appended claims.

We claim:

1. Bolt construction including a bolt, a bolt engagement member, frame means operably mounting the bolt longitudinally reciprocal outwardly to an engaged position partially received in the engagement member and inwardly to a disengaged position free of said engagement member, an operating member operably connected to the bolt reciprocally moving the bolt longitudinally between said engaged and disengaged positions upon reciprocal movement of the operating member, means operably connected to the operating member for reciprocally moving the operating member and bolt between said engaged and disengaged positions, the operable connection between the operating member and bolt including connection means mounted for limited telescoping of the bolt with the operating member from a normal position longitudinally inwardly to a blocked position, said limited telescoping being less than the distance the bolt is received in the engagement member when said bolt is in normal engaged position, expandable blocking means operably engaged between the operating member and bolt in combination with said connection means normally retaining the operating member and bolt in normal position for normal simultaneous reciprocal movement of the operating member and bolt between said outward engaged and inward disengaged positions, a tapered surface on one of the operating member and bolt, the expandable blocking means being engaged between said tapered surface and the other of said operating member and bolt when the bolt is in said normal position with respect to the operating member, at least part of the blocking means being urged along the tapered surface and expanding into blocking engagement with the frame means and so that the blocking means blocks directly between said frame means and bolt when the operating member and bolt are in outward engaged position and an exterior force is applied to any part of the bolt separate from said operating member urging the bolt inwardly toward disengaged position and causing said limited telescoping of the bolt with the operating member to said blocked position, and the blocking means being constructed to remain positively free of expansion and blocking during normal positioning and movement of the operating member and bolt between normal engaged and disengaged positions by said operating member and bolt moving means and expandable to block only upon said urging of said bolt from engaged toward disengaged position by said exterior force.

2. Bolt construction including a bolt, a bolt engagement member, frame means operably mounting the bolt longitudinally reciprocal outwardly to an engaged position partially received in the engagement member and inwardly to a disengaged position free of said engagement member, an operating member operably connected to the bolt reciprocally moving the bolt longitudinally between said engaged and disengaged positions upon reciprocal movement of the operating member, means operably connected to the operating member for reciprocally moving the operating member and bolt between said engaged and disengaged positions, the operable connection between the operating member and bolt including portions of the operating member and bolt telescoped in a normal position and mounted for further limited telescoping of the bolt with the operating member from said normal position longitudinally inwardly to a blocked position, said further limited telescoping being less than the distance the bolt is received in the engagement member when said bolt is in normal engaged position, expandable blocking means operably engaged between the operating member and bolt in combination with said operating member and bolt telescoped portions normally retaining the operating member and bolt in normal telescoped position for normal simultaneous reciprocal movement of the operating member and bolt between said outward engaged and inward disengaged positions, a tapered surface on one of the operating member and bolt, the expandable blocking means being engaged between said tapered surfaces and the other of said operating member and bolt when the bolt is in said normal telescoped position with respect to the operating member, at least part of the blocking means being urged along the tapered surface and expanding into blocking engagement with the frame means and so that the blocking means blocks directly between said frame means and bolt when the operating member and bolt are in outward engaged position and an exterior force is applied to any part of the bolt separate from said operating member urging the bolt inwardly toward disengaged position and causing said further limited telescoping of the bolt with the operating member to said blocked position, and the blocking means being constructed to remain positively free of expansion and blocking during normal positioning and movement of the operating member and bolt between normal engaged and disengaged positions by said operating member and bolt moving means and expandable to block only upon said urging of said bolt from engaged toward disengaged position by said exterior force.

3. Bolt construction including a bolt, a bolt engagement member, frame means operably mounting the bolt longitudinally reciprocal outwardly to a normal engaged position partially received in the engagement member and inwardly to a disengaged position free of said engagement member, an operating member operably connected to the bolt reciprocally moving the bolt longitudinally between said engaged and disengaged positions upon reciprocal movement of the operating member, means operably connected to the operating member for reciprocally moving the operating member and bolt between said engaged and disengaged positions, the operable connections between the operating member and bolt including connection means mounted for limited telescoping of the bolt with the operating member from a normal position longitudinally inwardly to a blocked position, said limited telescoping being less than the distance the bolt is received in the engagement member when said bolt is in normal engaged position, expandable collar means positioned in abutting engagement between the operating member and bolt and substantially surrounding parts of said connection means, said expandable collar means in combination with said connection means normally retaining the operating member and bolt in normal position for normal simultaneous reciprocal movement of the operating member and bolt between said outward engaged and inward disengaged positions, a tapered surface on one of the operating member and bolt, the expandable collar means being in abutting engagement between said tapered surface and the other of said operating member and bolt surrounding said parts of the connection means when the bolt is in said normal position with respect to the operating member, and the expandable collar means being urged along the tapered surface and substantially surrounding a part of the tapered surface and expanding laterally directly into blocking engagement with the frame means and abutting engagement between said frame means and bolt when the operating member and bolt are in outward engaged position and an exterior force is applied to any part of the bolt separate from said operating member urging the bolt inwardly toward disengaged position and causing said limited telescoping of the bolt with the operating member to said blocked position.

4. Bolt construction including a bolt, a bolt engagement member, frame means operably mounting the bolt longitudinally reciprocal outwardly to a normal engaged position partially received in the engagement member and inwardly to a disengaged position free of said engagement member, an operating member operably connected to the bolt reciprocally moving the bolt longitudinally between said engaged and disengaged positions upon reciprocal movement of the operating member, means operably connected to the operating member for reciprocally moving the operating member and bolt longitudinally between said engaged and disengaged positions, the operable connection between the operating member and bolt including connection means mounted for limited longitudinal telescoping of the bolt with the operating member from a normal position longitudinally inwardly to a blocked position, said limited telescoping being less than the longitudinal distance the bolt is received in the engagement member when said bolt is in said normal engaged position, expandable split spring collar means positioned in abutting engagement between the operating member and bolt and substantially surrounding parts of said connection means, said collar means in combination with said connection means normally retaining the operating member and bolt and in normal position for normal simultaneous reciprocal movement of the operating member and bolt between said outward engaged and inward disengaged positions, a tapered surface on one of the operating member and bolt, the collar means being in abutting engagement between said tapered surface and the other of said operating member and bolt surrounding said parts of the connection means when the bolt is in said normal position with respect to the operating member, the collar means being longitudinally stationary relative to said other of said operating member and bolt due to the abutment of the collar means with said other of said operating member and bolt, and the collar means being urged longitudinally along the tapered surface and substantially surrounding a part of the tapered surface and expanding laterally directly into blocking engagement with the frame means and abutting engagement between said frame means and bolt when the operating member and bolt are in outward engaged position and an exterior force is applied to any part of the bolt separate from said operating member urging the bolt longitudinally inwardly toward disengaged position and causing said limited telescoping of the bolt with the operating member to said blocked position.

5. Bolt construction as defined in claim 4 in which the connection means mounting the bolt and operating member for limited telescoping from said normal position inwardly to said blocked position includes releasable means normally holding the operating member and bolt stationary relative to each other and in said normal position until released by said exterior force applied to any part of the bolt urging the bolt inwardly toward disengaged position and causing said limited telescoping of the bolt with the operating member to said blocked position.

6. Bolt construction including a longitudinally extending bolt, a bolt engagement member, frame means operably mounting the bolt longitudinally reciprocal outwardly to a normal engaged position partially received in the engagement member and inwardly to a disengaged position free of said engagement member, an operating member having a longitudinally outwardly laterally decreasing tapered surface, the operating member terminating longitudinally outwardly from said tapered surface in a longitudinally extending connecting portion, the operating member connecting portion being partially longitudinally telescoped within the bolt for limited relative telescoping between the operating member and bolt between a normal telescoped position and a blocked telescoped position telescoped longitudinally a limited amount greater than said normal telescoped position, generally laterally extending pin means engaged laterally with the operating member connecting portion within the bolt and normally longitudinally inwardly abutting the bolt when the bolt is in said normal telescoped position with reference to the operating member but movable outwardly within the bolt when the bolt moves from said normal telescoped to blocked telescoped position with reference to the operating member, an expandable split spring collar longitudinally outwardly abutting the bolt and normally longitudinally inwardly abutting an outward portion of the operating member tapered surface and spanning the longitudinal distance between said tapered surface and bolt, said abutment of said expandable collar between the operating member and bolt normally retaining said operating member and bolt longitudinally stationary relative to each other and the bolt in said normal telescoped position during longitudinal movement of the operating member and bolt from disengaged to engaged position, said longitudinal rearward abutment of said pin means with the bolt normally retaining the operating member and bolt longitudinally stationary with respect to each other during longitudinal movement of said operating member and bolt from engaged to disengaged position, means operably connected to the operating member for reciprocally moving the operating member and bolt between said engaged and disengaged positions, the limited telescoping of the bolt with the operating member from said normal telescoped position longitudinally inwardly to said blocked telescoped position being of less longitudinal distance than the longitudinal distance the bolt is received in the engagement member when the bolt is in normal engaged position, a laterally extending shoulder formed on the frame means laterally adjacent the operating member tapered surface and longitudinally inwardly of said expandable collar when the operating member and bolt are in normal engaged position, and the bolt moving longitudinally inwardly relative to the operating member from said normal telescoped position to said blocked telescoped position when the operating member and bolt are in normal engaged position and an external force is applied to any part of the bolt separate from said operating member urging the bolt inwardly toward disengaged position sufficient to move said expandable collar longitudinally inwardly along the operating member tapered surface and thereby expand said expandable collar laterally into blocking engagement with the frame means shoulder and between said frame means shoulder and the bolt.

7. Bolt construction including a longitudinally extending bolt, a bolt engagement member, frame means operably mounting the bolt longitudinally reciprocal outwardly to a normal engaged position partially received in the engagement member and inwardly to a disengaged position free of said engagement member, an operating member having a longitudinally outwardly laterally decreasing tapered surface, the operating member terminating longitudinally outwardly from said tapered surface in a longitudinally extending connecting portion, the operating member connecting portion being partially longitudinally telescoped within the bolt for limited relative telescoping between the operating member and bolt between a normal telescoped position and a blocked telescoped position telescoped longitudinally a limited amount greater than said normal telescoped position, knurled surface means formed on the operating member connecting portion engaged by a press fit within the bolt for normally retaining the operating member and bolt against relative longitudinal movement and the bolt in said normal position, an expandable split spring collar longitudinally outwardly abutting the bolt and normally longitudinally inwardly abutting an outward portion of the operating member tapered surface and spanning the longitudinal distance between said tapered surface and bolt, said abutment of said expandable collar between the operating member and bolt within said knurled surface means normally retaining said operating member and bolt longitudinally stationary relative to each other and the bolt in said normal telescoped position during longitudinal movement of the operating member and bolt from disengaged to engaged position, said knurled surface means normally retaining the operating member and bolt longitudinally stationary with respect to each other during movement of said operating member and bolt from engaged to disengaged position, means operably connected to the operating member for reciprocally moving the operating member and bolt between said engaged and disengaged positions, the limited telescoping of the bolt with the operating member from said normal telescoped position longitudinally inwardly to said blocked telescoped position being of less longitudinal distance than the longitudinal distance the bolt is received in the engagement member when the bolt is in normal engaged position, a laterally extending shoulder formed on the frame means longitudinally adjacent the operating member tapered surface and longitudinally inwardly of said expandable collar when the operating member and bolt are in normal engaged position, and the bolt moving longitudinally inwardly relative to the operating member from said normal telescoped position to said blocked telescoped position when the operating member and bolt are in normal engaged position and an external force is applied to any part of the bolt separate from said operating member urging the bolt inwardly toward disengaged position sufficient to release the knurled surface means from the bolt and to move said expandable collar longitudinally inwardly along the operating member tapered surface and thereby expand said expandable collar laterally into blocking engagement with the frame means shoulder and between said frame means shoulder and the bolt.

8. Bolt construction including a longitudinally extending bolt, a bolt engagement member, frame means operably mounting the bolt longitudinally reciprocal outwardly to a normal engaged position partially received in the engagement member and inwardly to a disengaged position free of said engagement member, an operating member having a longitudinally outwardly laterally decreasing tapered surface, the operating member terminating longitudinally outwardly from said tapered surface in a longitudinally extending connecting portion, the operating member connecting portion being partially longitudinally telescoped within the bolt for limited relative telescoping between the operating member and bolt between a normal telescoped position and a blocked telescoped position telescoped longitudinally a limited amount greater than said normal telescoped position, knurled surface means formed on the operating member connecting portion engaged by a press fit within the bolt for normally retaining the operating member and bolt against relative longitudinal movement and the bolt in said normal position, generally laterally extending pin means engaged laterally with the operating member connecting portion within the bolt and normally longitudinally inwardly abutting the bolt when the bolt is in said normal telescoped position with reference to the operating member but movable outwardly within the bolt when the bolt moves from said normal telescoped to blocked telescoped position with reference to the operating member, an expandable split spring collar longitudinally outwardly abutting the bolt and normally longitudinally inwardly abutting an outward portion of the operating member tapered surface and spanning the longitudinal distance between said tapered surface and bolt, said abutment of said expandable collar between the operating member and bolt and said knurled surface means normally retaining said operating member and bolt longitudinally stationary relative to each other and said bolt in said normal telescoped position during longitudinal movement of the operating member and the bolt from disengaged to engaged position, said longitudinal rearward abutment of said pin means with the bolt and said knurled surface means normally retaining the operating member and bolt longitudinally stationary with respect to each other during longitudinal movement of said operating member and bolt from engaged to disengaged position, means operably connected to the operating member for reciprocally moving the operating member and bolt between said engaged and disengaged positions, the limited telescoping of the bolt with the operating member from said normal telescoped position longitudinally inwardly to said blocked telescoped position being of less longitudinal distance than the longitudinal distance the bolt is received in the engagement member when the bolt is in normal engaged position, a laterally extending shoulder formed on the frame means laterally adjacent the operating member tapered surface and longitudinally inwardly of said expandable collar when the operating member and bolt are in normal engaged position, and the bolt moving longitudinally inwardly relative to the operating member from said normal telescoped position to said blocked telescoped position when the operating member and bolt are in normal engaged position and an external force is applied to any part of the bolt separate from said operating member urging the bolt inwardly toward disengaged position sufficient to release said knurled surface means from the bolt and to move said expandable collar longitudinally inwardly along the operating member tapered surface and thereby expand said expandable collar laterally into blocking engagement with the frame means shoulder and between said frame means shoulder and the bolt.

9. Bolt construction including a longitudinally extending bolt, a bolt engagement member, frame means operably mounting the bolt longitudinally reciprocal outwardly to a normal engaged position partially received in the engagement member and inwardly to a disengaged position free of said engagement member, an operating member having a longitudinally extending outwardly opening recess formed therein opening outwardly of an outer end, the bolt having an inner end and a longitudinally extending actuating member extending longitudinally inwardly and telescoped within the operating member recess, the operating member recess and bolt actuating member normally mounting the bolt relative to the operating member with the bolt inner end spaced from the operating member outer end in a normal telescoped position and the bolt movable longitudinally inwardly relative to the operating member with the bolt actuating member telescoped within the operating member recess a limited greater longitudinal distance into a blocked telescoped position, the bolt actuating member having a laterally extending arcuate cam surface, the operating member having a laterally extending segment groove formed therein opening laterally toward the frame means and terminating laterally spaced from the operating member recess, the operating member having a series of ball openings formed therein extending laterally between and communicating with the segment groove and recess, the bolt actuating member cam groove being generally laterally aligned with the operating member segment groove and ball openings when the bolt is in said normal telescoped position relative to the operating member, balls positioned in the operating member ball openings normally extending laterally into the bolt actuating member cam groove normally engaging between the bolt actuating member and the operating member, a series of blocking segments normally confined laterally within the operating member segment groove by a press fit and laterally abutting said balls normally maintaining said balls engaged between the operating member and bolt actuating member and engaged within said actuating member cam groove, means operably connected to the operating member for reciprocally moving the operating member and bolt longitudinally between said engaged and disengaged positions, a shoulder formed on the frame means generally laterally aligned with a longitudinally inward edge of the operating member segment groove when the operating member and bolt are in said normal engaged position, the limited telescoping of the bolt with the operating member from said normal telescoped position longitudinally inwardly to said blocked telescoped position being of less longitudinal distance than the longitudinal distance the bolt is received in the engagement member when the bolt is in normal engaged position, and the bolt moving longitudinally inwardly relative to the operating member from said normal telescoped position to said blocked telescoped position when the operating member and bolt are in normal engaged position and an external force is applied to any part of the bolt separate from said operating member urging the bolt inwardly toward disengaged position sufficient to urge the blocking segments laterally from their confined press fit positions in the operating member segment groove by the bolt actuating member telescoping a greater longitudinal extent in the operating member recess to said blocked telescoped position removing said actuating member cam slot from lateral alignment with said balls and forcing the balls to expand laterally against said blocking segments and thereby forcing said blocking segments into blocking engagement with the frame means shoulder and between said frame means shoulder and the bolt through the operating member.

10. Bolt construction including a longitudinally extending bolt, a bolt engagement member, frame means operably mounting the bolt longitudinally reciprocal outwardly to a normal engaged position partially received in the engagement member and inwardly to a disengaged position free of said engagement member, an operating member having a longitudinally outwardly laterally decreasing tapered surface, the operating member terminating longitudinally outwardly from said tapered surface in a longitudinally extending connecting portion, the operating member connecting portion being partially longitudinally telescoped within the bolt for limited relative telescoping between the operating member and bolt between a normal telescoped position and a blocked telescoped position telescoped longitudinally a limited amount greater than said normal telescoped position, the operating member connecting portion being engaged by a press fit within the bolt for normally retaining the operating member and bolt against relative longitudinal movement and the bolt in said normal position, a collet telescoped with the operating member connecting portion longitudinally outwardly abutting the bolt and having generally longitudinally extending blocking fingers abutting the operating member tapered surface, said collet blocking fingers normally being free of interference with the frame means during movement of the operating member and bolt between said engaged and disengaged positions when the bolt is in said normal telescoped position relative to the operating member, means operably connected to the operating member for reciprocally moving the operating member and bolt between said engaged and disengaged positions, the limited telescoping of the bolt with the operating member from said normal telescoped position longitudinally inwardly to said blocked telescoped position being of less longitudinal distance than the longitudinal distance the bolt is received in the engagement member when the bolt is in normal engaged position, a shoulder formed on the frame means spaced longitudinally inwardly from the collet blocking fingers approximately the same longitudinal distance as the longitudinal distance of the limited telescoping of the bolt with the operating member from said normal telescoped position to said blocked telescoped position when the operating member and bolt are in said normal engaged position, and the bolt moving longitudinally inwardly relative to the operating member from said normal telescoped position to said blocked telescoped position when the operating member and bolt are in normal engaged position and an external force is applied to any part of the bolt separate from said operating member urging the bolt inwardly toward disengaged position sufficient to move the collet blocking fingers longitudinally inwardly along the operating member tapered surfaces to expand said blocking fingers laterally into blocking engagement with the frame means shoulder and between the frame means shoulder and the bolt.

11. Bolt construction including a bolt, a bolt engagement member, frame means operably mounting the bolt for substantially straight longitudinal movement between an outward engaged position partially received in the engagement member and an inward disengaged position free of said engagement member, all of that portion of the bolt extending from the frame means and into the bolt engagement member presenting a solid bolt surface, bolt moving means operable for moving the bolt longitudinally between engaged and disengaged positions, connection means between the bolt and bolt moving means for operably connecting the bolt to the bolt moving means normally simultaneously movable with said bolt moving means between said engaged and disengaged positions and relative movement of the bolt substantially straight longitudinally inward with respect to the bolt moving means into a blocked position still engaged with the bolt engagement member when the bolt and bolt moving means are in said engaged position and any part of the bolt is urged from said engaged position inward toward disengaged position by an exterior force on any part of said bolt separate from said bolt moving means, said connection means including bolt blocking means operably connected to the bolt for automatic movement of at least part of said blocking means laterally outwardly from a normal position in which the bolt and bolt moving means are freely simultaneously movable between said engaged and disengaged positions and a blocking position with said blocking means engaged directly laterally between the bolt and frame means effectively directly blocking the bolt in an engaged position when said bolt and bolt moving means are in said engaged positions and said bolt is moved inwardly to said blocked position by said exterior force on any part of said bolt, and the blocking means being constructed to remain positively inoperable during normal positioning and movement of the bolt between normal engaged and disengaged positions by said bolt moving means and operable only upon said urging of said bolt from engaged toward disengaged position by said exterior force.

12. Bolt construction including a bolt, a bolt engagement member, frame means operably mounting the bolt for substantially straight longitudinal movement between an outward engaged position partially received in the engagement member and an inward disengaged position free of said engagement member, all of that portion of the bolt extending from the frame means and into the bolt engagement member presenting a solid bolt surface, bolt moving means operable for moving the bolt longitudinally between engaged and disengaged positions, connection means between the bolt and bolt moving means for operably connecting the bolt to the bolt moving means normally simultaneously movable with said bolt moving means longitudinally between said engaged and disengaged positions and relative longitudinal movement of the bolt substantially straight longitudinally inward with respect to the bolt moving means into a blocked position still engaged with the bolt engagement member when the bolt and bolt moving means are in said engaged position and any part of the bolt is urged longitudinally from said engaged position inward toward disengaged position by an exterior force on any part of said bolt separate from said bolt moving means, said connection means including bolt blocking means operably connected to the bolt for automatic movement of at least part of said blocking means from a normal position in which the bolt and bolt moving means are freely longitudinally movable between said engaged and disengaged positions and a blocking position with the bolt blocking means extending in a plurality of lateral directions laterally between and engaging the bolt and frame means effectively directly blocking the bolt in an engaged position when said bolt and bolt moving means are in said engaged positions and said bolt is moved inwardly to said blocked position by said exterior force on any part of said bolt, and the blocking means being constructed to remain positively inoperable during normal positioning and movement of the bolt between normal engaged and disengaged positions by said bolt moving means and operable only upon said urging of said bolt from engaged toward disengaged position by said exterior force.

13. Bolt construction including a bolt, a bolt engagement member, frame means operably mounting the bolt for substantially straight longitudinal movement between an outward engaged position partially received in the engagement member and an inward disengaged position free of said engagement member, all of that portion of the bolt extending from the frame means and into the bolt engagement member presenting a solid bolt surface, bolt moving means operable for moving the bolt longitudinally between engaged and disengaged positions, connection means between the bolt and bolt moving means for operably connecting the bolt to the bolt moving means normally simultaneously movable with said bolt moving means longitudinally between said engaged and disengaged positions and relative longitudinal movement of the bolt substantially straight longitudinally inward with respect to the bolt moving means into a blocked position still engaged with the bolt engagement member when the bolt and bolt moving means are in said engaged position and any part of the bolt is urged longitudinally from said engaged position inward toward disengaged position by an exterior force on any part of said bolt separate from said bolt moving means, a shoulder formed on the frame means generally laterally adjacent the connection means when the bolt and bolt moving means are in said engaged positions, said connection means including bolt blocking means operably connected to the bolt for automatic movement of at least part of said blocking means from a normal position in which the bolt and bolt moving means are freely movable between said engaged and disengaged positions and a blocking position with the bolt blocking means engaged laterally with the frame means shoulder and between the bolt and said frame means shoulder effectively directly blocking the bolt in an engaged position when said bolt and bolt moving means are in said engaged positions and said bolt is moved inwardly to said blocked position by said exterior force on any part of said bolt, and the blocking means being constructed to remain positively inoperable during normal positioning and movement of the bolt between normal engaged and disengaged positions by said bolt moving means and operable only upon said urging of said bolt from engaged toward disengaged position by said exterior force.

14. Bolt construction including a bolt, a bolt engagement member, frame means operably mounting the bolt substantially straight longitudinally reciprocal outwardly to a normal engaged position partially received in the engagement member and inwardly to a disengaged position free of said engagement member, all of that portion of the bolt extending from the frame means and into the bolt engagement member presenting a solid bolt surface, an operating member operably connected to the bolt reciprocally moving the bolt longitudinally between said engaged and disengaged positions upon reciprocal movement of the operating member, means operably connected to the operating member for reciprocally moving the operating member and bolt between said engaged and disengaged positions, the operable connection between the operating member and bolt including connection means mounted for limited telescoping of the bolt with the operating member from a normal position substantially straight longitudinally inwardly to a blocked position, said limited telescoping being less than the distance the bolt is received in the engagement member when said bolt is in normal engaged position, expandable blocking means operably engaged between the operating member and bolt in combination with said connection means normally retaining the operating member and bolt in normal position for normal simultaneous reciprocal movement of the operating member and bolt between said outward engaged and inward disengaged positions, actuating means operably connected to the expandable blocking means for operably expanding at least part of said blocking means laterally into a blocking engagement with the frame means and with the blocking means directly between said frame means and bolt when the operating member and bolt are in outward engaged position and an exterior force is applied to any part of the bolt separate from said operating member urging the bolt inwardly toward disengaged position and causing said limited telescoping of the bolt with the operating member to said blocked position, and the blocking means and actuating means being constructed and arranged to remain positively inoperable during normal positioning and movement of the operating member and bolt between normal engaged and disengaged positions by said operating member and bolt moving means and operable only upon said urging of said bolt from engaged toward disengaged position by said exterior force.

15. Bolt construction including a bolt, a bolt engagement member, frame means operably mounting the bolt substantially straight longitudinally reciprocal outwardly to a normal engaged position partially received in the engagement member and inwardly to a disengaged position free of said engagement member, all of that portion of the bolt extending from the frame means and into the bolt engagement member presenting a solid bolt surface, an operating member operably connected to the bolt reciprocally moving the bolt longitudinally between said engaged and disengaged positions upon reciprocal movement of the operating member, means operably connected to the operating member for reciprocally moving the operating member and bolt between said engaged and disengaged positions, the operable connection between the operating member and bolt including connection means mounted for limited telescoping of the bolt with the operating member from a normal position substantially straight longitudinally inwardly to a blocked position, said limited telescoping being less than the distance the bolt is received in the engagement member when said bolt is in normal engaged position, expandable blocking means operably engaged between the operating member and bolt in combination with said connection means normally retaining the operating member and bolt in normal position for normal simultaneous reciprocal movement of the operating member and bolt between said outward engaged and inward disengaged positions, a shoulder formed on the frame means laterally adjacent the expandable blocking means when the operating member and bolt are in engaged position, actuating means operably connected to the expandable blocking means for expanding at least part of said blocking means laterally into blocking engagement with the frame means shoulder so that the blocking means blocks directly between said frame means shoulder and bolt when the operating member and bolt are in outward engaged position and an exterior force is applied to any part of the bolt separate from said operating member urging the bolt inwardly toward disengaged position and causing said limited telescoping of the bolt with the operating member to said blocked position, and the blocking means and actuating means being constructed and arranged to remain positively inoperable during normal positioning and movement of the operating member and bolt between normal engaged and disengaged positions by said operating member and bolt moving means and operable only upon said urging of said bolt from engaged toward disengaged position by said exterior force.

16. Bolt construction including a bolt, a bolt engagement member, frame means operably mounting the bolt substantially straight longitudinally reciprocal outwardly to a normal engaged position partially received in the engagement member and inwardly to a disengaged position free of said engagement member, all of that portion of the bolt extending from the frame means and into the bolt engagement member presenting a solid bolt surface, an operating member operably connected to the bolt reciprocally moving the bolt longitudinally between said engaged and disengaged positions upon reciprocal movement of the operating member, means operably connected to the operating member for reciprocally moving the operating member and bolt between said engaged and disengaged positions, the operable connection between the operating member and bolt including connection means mounted for limited relative movement of the bolt inwardly with respect to the operating member from a normal position substantially straight longitudinally inwardly to a blocked position, said limited inward relative movement being less than the distance the bolt is received in the engagement member when said bolt is in normal engaged position, expandable blocking means operably engaged between the operating member and bolt in combination with said connection means normally retaining the operating member and bolt in normal position for normal simultaneous reciprocal movement of the operating member and bolt between said outward engaged and inward disengaged positions, actuating means on one of the operating member and bolt operably connected to the expandable blocking means for expanding at least part of said blocking means laterally into a blocking engagement so that the blocking means blocks directly between the bolt and frame means when the operating member and bolt are in outward engaged position and an exterior force is applied to any part of the bolt separate from said operating member urging the bolt inwardly toward disengaged position and causing said limited relative movement of the bolt to said blocked position, and the blocking means and actuating means being constructed and arranged to remain positively inoperable during normal positioning and movement of the operating member and bolt between normal engaged and disengaged positions by said operating member and bolt moving means and operable only upon said urging of said bolt from engaged toward disengaged position by said exterior force.

17. Bolt construction as defined in claim 16 in which the frame means has portions laterally adjacent the expandable blocking means when the operating member and bolt are in normal engaged position; and in which the actuating means expands said at least part of the blocking means laterally into direct blocking engagement with said frame means portions when the operating member and bolt are in outward engaged position and said exterior force is applied to any part of said bolt moving the bolt to said blocked position.

18. Bolt construction including a bolt, a bolt engagement member, frame means operably mounting the bolt for substantially straight longitudinal movement between an engaged position with an end portion extending from said frame means and received in the engagement member and a disengaged position free of said engagement member, all of the bolt end portion extending from the frame means and into the bolt engagement member presenting a solid bolt surface, means operably connected to the bolt and operable for moving the bolt longitudinally between engaged and disengaged positions, blocking means having at least portions movable laterally outwardly for automatic operation of said means directly between the bolt and frame means upon an urging of any part of the bolt end portion from engaged position toward disengaged position by an exterior force on said bolt separate from said bolt moving means to directly block the bolt in an engaged position and against surreptitious movement to disengaged position, the operable mounting of the bolt by the frame means maintaining the bolt aligned in its normal substantially straight longitudinal path of travel at all times and during engagement of said blocking between the bolt and frame means, and the blocking means being constructed to remain positively inoperable during normal positioning and movement of the bolt between normal engaged and disengaged positions by said bolt moving means and operable only upon said urging of said bolt end portion from engaged toward disengaged position by said exterior force.

19. Bolt construction including a bolt, a bolt engagement member, frame means operably mounting the bolt for substantially straight longitudinal movement between an engaged position with an end portion extending from said frame means and received in the engagement member and a disengaged position free of said engagement member, means operably connected to the bolt and operable for moving the bolt longitudinally between engaged and disengaged positions, blocking means having at least portions movable laterally outwardly operably connected to the bolt for direct automatic engagement of said means between the bolt and frame means upon an urging of any part of the bolt end portion from engaged toward disengaged position by an exterior force on the bolt separate from said bolt moving means to directly block the bolt in an engaged position and against movement to disengaged position, the operable mounting of the bolt by the frame means maintaining the bolt aligned in its normal substantially straight longitudinal path of travel at all times and during engagement of said blocking means between the bolt and frame means, and the blocking means being constructed to remain positively inoperable during normal positioning and movement of the bolt between normal engaged and disengaged positions by said bolt moving means and operable only upon said urging of said bolt end portion from engaged toward disengaged position by said exterior force.

References Cited in the file of this patent
UNITED STATES PATENTS

| | | |
|---|---|---|
| 685,188 | Taylor | Oct. 22, 1901 |
| 1,800,662 | Rush | Apr. 14, 1931 |
| 1,802,784 | Scott | Apr. 28, 1931 |
| 1,964,157 | Holtzman | June 26, 1934 |
| 2,099,678 | Curtis | Nov. 23, 1937 |
| 2,350,306 | Spain | May 30, 1944 |
| 2,947,160 | Wolters | Aug. 2, 1960 |

FOREIGN PATENTS

| | | |
|---|---|---|
| 814,816 | Great Britain | June 10, 1959 |